US008887052B1

(12) United States Patent
Young

(10) Patent No.: US 8,887,052 B1
(45) Date of Patent: Nov. 11, 2014

(54) PRESENTATION REMOTE CONTROL

(75) Inventor: David S. Young, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1353 days.

(21) Appl. No.: 12/649,550

(22) Filed: Dec. 30, 2009

Related U.S. Application Data

(60) Provisional application No. 61/143,625, filed on Jan. 9, 2009.

(51) Int. Cl.
*G06F 3/048* (2013.01)
(52) U.S. Cl.
USPC ........... 715/732; 715/203; 715/740; 715/748; 709/205
(58) Field of Classification Search
USPC ................................. 715/730, 732, 740, 864
See application file for complete search history.

(56) References Cited

U.S. PATENT DOCUMENTS

| | | | |
|---|---|---|---|
| 5,204,768 A | 4/1993 | Tsakiris et al. | |
| 6,137,473 A | 10/2000 | Cortopassi et al. | |
| 6,144,848 A | 11/2000 | Walsh et al. | |
| 6,186,630 B1 | 2/2001 | Miyashita | |
| 6,278,499 B1 | 8/2001 | Darbee et al. | |
| 6,346,933 B1 | 2/2002 | Lin | |
| 7,005,966 B1 | 2/2006 | Leman et al. | |
| 7,006,055 B2 * | 2/2006 | Sukthankar et al. | ........... 345/1.2 |
| 7,059,724 B2 | 6/2006 | Miyashita | |
| 7,434,166 B2 * | 10/2008 | Acharya et al. | ............... 715/740 |
| 7,471,281 B2 | 12/2008 | Masters et al. | |
| 7,512,671 B1 | 3/2009 | Gladwin et al. | |
| 2005/0036509 A1 * | 2/2005 | Acharya et al. | ............... 370/466 |
| 2005/0168372 A1 | 8/2005 | Hollemans | |
| 2008/0284739 A1 | 11/2008 | Andrews et al. | |
| 2009/0002217 A1 | 1/2009 | Kryze et al. | |

OTHER PUBLICATIONS

"Free iPhone remote control for Keynote" [online] Ken Drake. Posted on Jan. 18, 2008. Retrieved from the Internet: Dec. 29, 2009. <http://www.keynoteuser.com/2008/01/18/free-iphone-remote-control-for-keynote/>.
"Keymote: iPhone/iPod Touch Remote Control for Apple Keynote" [online] Retrieved from the Internet: Dec. 29, 2009. <http://manas.tungare.name/software/keymote/>.
"iPhone PowerPoint Remotes Give Perfect Presentations" [online] Feb. 5, 2009. Retrieved from the Internet: Dec. 29, 2009.<http://www.pcworld.com/businesscenter/article/159020/iphone_powerpoint-remotes_give_perfect_presentations.html>.

* cited by examiner

*Primary Examiner* — Namitha Pillai
(74) *Attorney, Agent, or Firm* — Fish & Richardson P.C.

(57) ABSTRACT

In general, the subject matter described in this specification can be embodied in methods for accessing a presentation stored on a remote server with a first computing device that is connected to the remote server over a network. The first computing device communicates with the network over a wireless connection. The first computing device is used to cause a second computing device to display the presentation. The second computing device is connected to the remote server over a network. The display of the presentation is substantially controlled with communication between the first computing device and the second computing device. The communication occurs only through the remote server.

5 Claims, 7 Drawing Sheets

US 8,887,052 B1

PRESENTATION REMOTE CONTROL

RELATED APPLICATIONS

This application claims the benefit under 35 U.S.C. §119 of U.S. Provisional Application No. 61/143,625, titled "Presentation Remote Control," filed Jan. 9, 2009, which is incorporated by reference herein in its entirety.

TECHNICAL FIELD

This document relates to systems and techniques for controlling a computer presentation through a network such as the internet.

BACKGROUND

In business, everyone knows that a picture is worth a thousand words (or more). In fact, oftentimes, several carefully chosen words are worth a thousand words. To get other people to back your ideas, you must present them in a way that the those other people can understand the ideas, and in a way that compels them to agree with you. As a result, presentations—whether sales, design, product pitches, or educational—are a large part of many people's workdays.

When presentations are made to groups of people, they are commonly presented as a series of slides prepared in a presentation management computer application. The slides may be printed on paper and may also be projected so that a room of people can see the slides together. Where the presenter must go to a remote location, she may bring her laptop computer along, pull it out of its bag, locate an electrical outlet (typically by crawling under a table), and locate a video cable for a projector in the room. Alternatively, the presenter might burn the presentation into a CD-ROM or DVD-ROM, or copy it to a portable memory device, and then insert the disk or device into a computer at the presentation site.

SUMMARY

This document describes systems and techniques that may be used to prepare and present an electronic presentation. The presentation may initially be prepared on a desktop or laptop computer on a central hosted system through the internet, or prepared and then uploaded to a server that is accessible over the internet. The presenter may then access and control the presentation from an internet-enabled wireless device such as a smartphone, to have the presentation shown over a separate system such as a computer and associated projector operated by the organization where the presentation is being made.

Such techniques and systems may provide one or more advantages in certain implementations. For example, a user can easily collaborate in building the presentation, where the presentation is stored in a location accessible over the internet. Also, a presenter can more readily access the presentation to review it even if they did not present it. In addition, the presenter can readily review the presentation from a mobile device, such as by previewing it in a cab on the way to the presentation site. If the presenter had to carry the presentation on a disk or flash drive, such review would no be possible. Once at the site, the presenter can control the presentation while moving freely through the room, and using a familiar interface—his or her cell phone or other mobile device. Such a personalized interface can be provided, in certain implementations, even where the presentation equipment belongs to another party, and even if the equipment only has a web browser and no presentation software.

In general, one aspect of the subject matter described in this specification can be embodied a method for accessing a presentation stored on a remote server with a first computing device that is connected to the remote server over a network. The first computing device communicates with the network over a wireless connection. The first computing device is used to cause a second computing device to display the presentation. The second computing device is connected to the remote server over a network. The display of the presentation is substantially controlled with communication between the first computing device and the second computing device. The communication occurs only through the remote server.

Another aspect of the subject matter described in this specification can be embodied in a computer-implemented presentation process that includes storing a presentation at a central server. Instructions are received for controlling the presentation from a web browser on a first remote computing device over a wireless network and at the central server. In response to the received instructions, the presentation is transmitted from the central server to a second remote computing device over a local area network or wide area network.

In yet another aspect, the subject matter described in this specification can be embodied a computer-implemented presentation system. The system includes persistent storage storing a plurality of presentations. The system includes an interface on a central computing device to receive presentation control instructions from a first remote computing device over a first wireless network segment. The system includes a presentation application on the central computing device to cause a presentation from the plurality to be transmitted from the central computing device and over a second network segment to a second remote computing device that is independent of the first remote computing device, and to control a display of the presentation on the second remote computing device in response to the received control instructions.

In yet one more aspect, the subject matter described in this specification can be embodied in a computer-implemented presentation system that includes persistent storage storing a plurality of slide-based electronic presentations. The system includes an interface at a server system to receive presentation control instructions from a first remote computing device. The system includes means for coordinating the received presentation control instructions with display of a presentation by a second computing device.

These and other implementations can optionally include one or more of the following features. A control panel can be displayed on the first computing device for navigating though the presentation. The presentation can be displayed on the first computing device and simultaneously displayed using the second computing device in coordination. Speaker notes can be displayed on the first computing device, in coordination with the display of the presentation using the second computing device. The second computing device can display the presentation using a standard web browser application.

The second computing device can be associated with a domain that is different from a domain with which the first computing device is associated. A URl can be provided for the presentation to the second device. Providing the URl to the second device can include transmitting the URl in a message from the first device to the second device. A cached copy of the presentation can be received at the second computing device. Controlling the display of the presentation at the second computing device can include receiving commands at the second computing device and from the remote server to change a slide of the cached presentation. Controlling the display of the presentation can include receiving a command at the remote server and from the first computing device to change a slide of the presentation. In response to the command, a portion of the presentation corresponding to a slide can be sent to the second computing device.

Simultaneously, meta-information relating to the presentation can be transmitted to the first computing device, and the presentation transmitted to the second computing device. The meta-information can relating to the presentation can include code for displaying a control for controlling the presentation. The meta-information relating to the presentation can include speaker notes or the presentation. The presentation and the meta-information relating to the presentation can be transmitted in a format for display using standard web browser applications. The second computing device can be associated with a domain that is different from a domain with which the first computing device is associated. A URl can be received at the central server a URl from the first device and separately a URL can be received at the central server from the second device. The presentation and information relating to the presentation can be separately transmitted in response to the receipt of the URl's.

Each presentation can be associated with a URl and the presentation application can cause a presentation to be displayed when commands are received from the first computing device and the second computing device containing the URl. The presentation application can be configured to transmit data for causing simultaneous display of the presentation on the second computing device and information relating to the presentation on the first computing device. The persistent storage can store speaker notes associated with the presentations. The presentation application can transmit the speakers notes in coordination with display of a corresponding presentation. The interface can transmit code for displaying presentation controls and code for displaying the presentations, for display on standard web browsers.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for making computer presentations, such as slide-based presentations popularized by applications like MICROSOFT POWERPOINT. The presentation may be made on, or uploaded to, a server that makes the presentation available, through simple log on, over the internet. A presenter may then access such a system with an internet-enabled device such as a smartphone to control the presentation, and a separate presentation system may access the presentation separately over the internet or a similar network and may be transmitted images of the presentation in cooperation with and under the control of the presenter manipulating his or her smartphone. Such techniques may, in effect, provide the presenter with a very full-featured remote control, but where the control travels out of the room, all the way over the internet, to a remote server, and then back into the room again (though the loop could also be through a LAN or similar network). Also, such control may be effected though standard applications such as SMS, MMS, and standard web browsers—both on the presenter's device and on the presentation device.

Figure 1A:
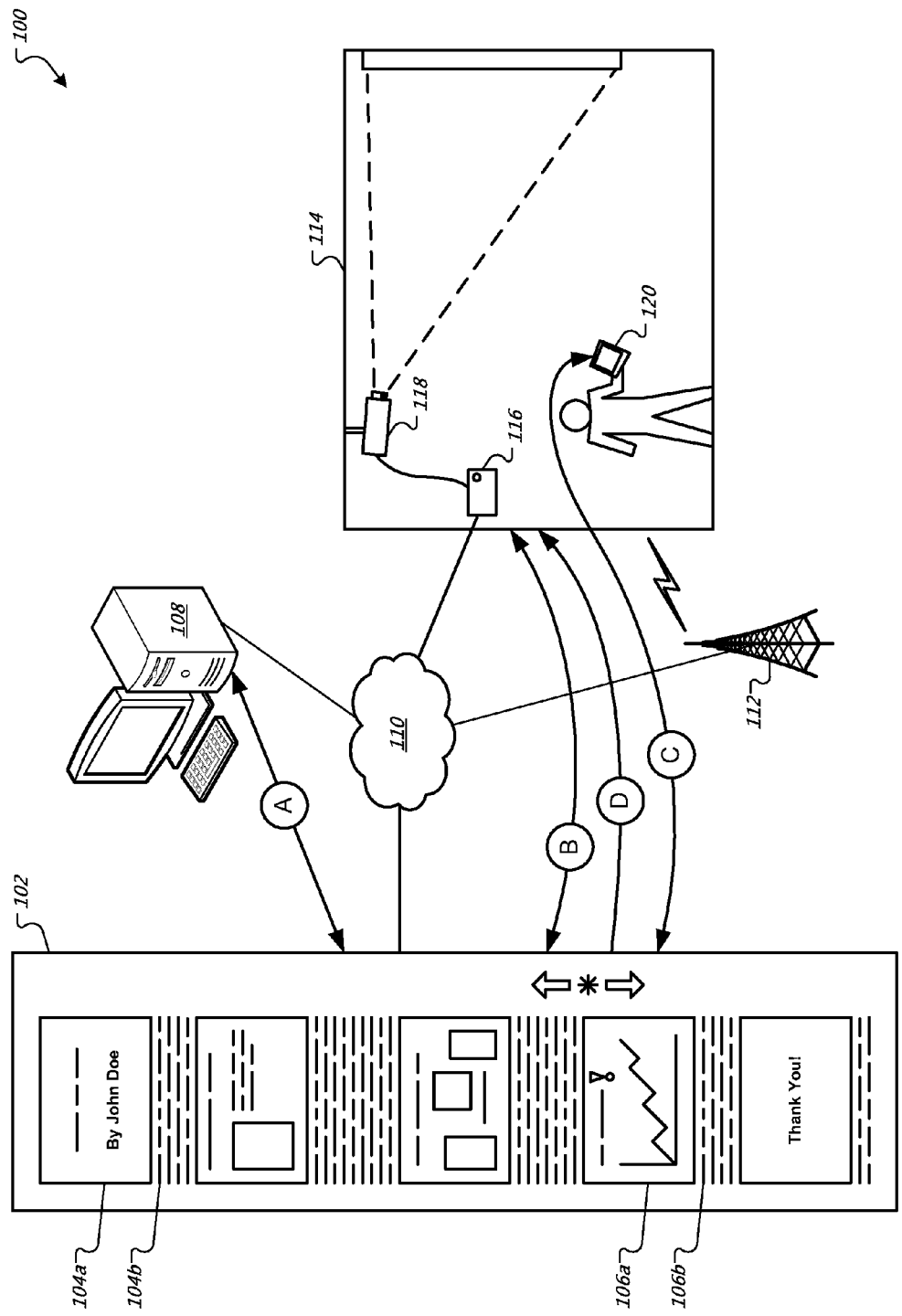
FIGS. 1A and 1B are conceptual diagrams of computer presentation systems.
Figure 1B:
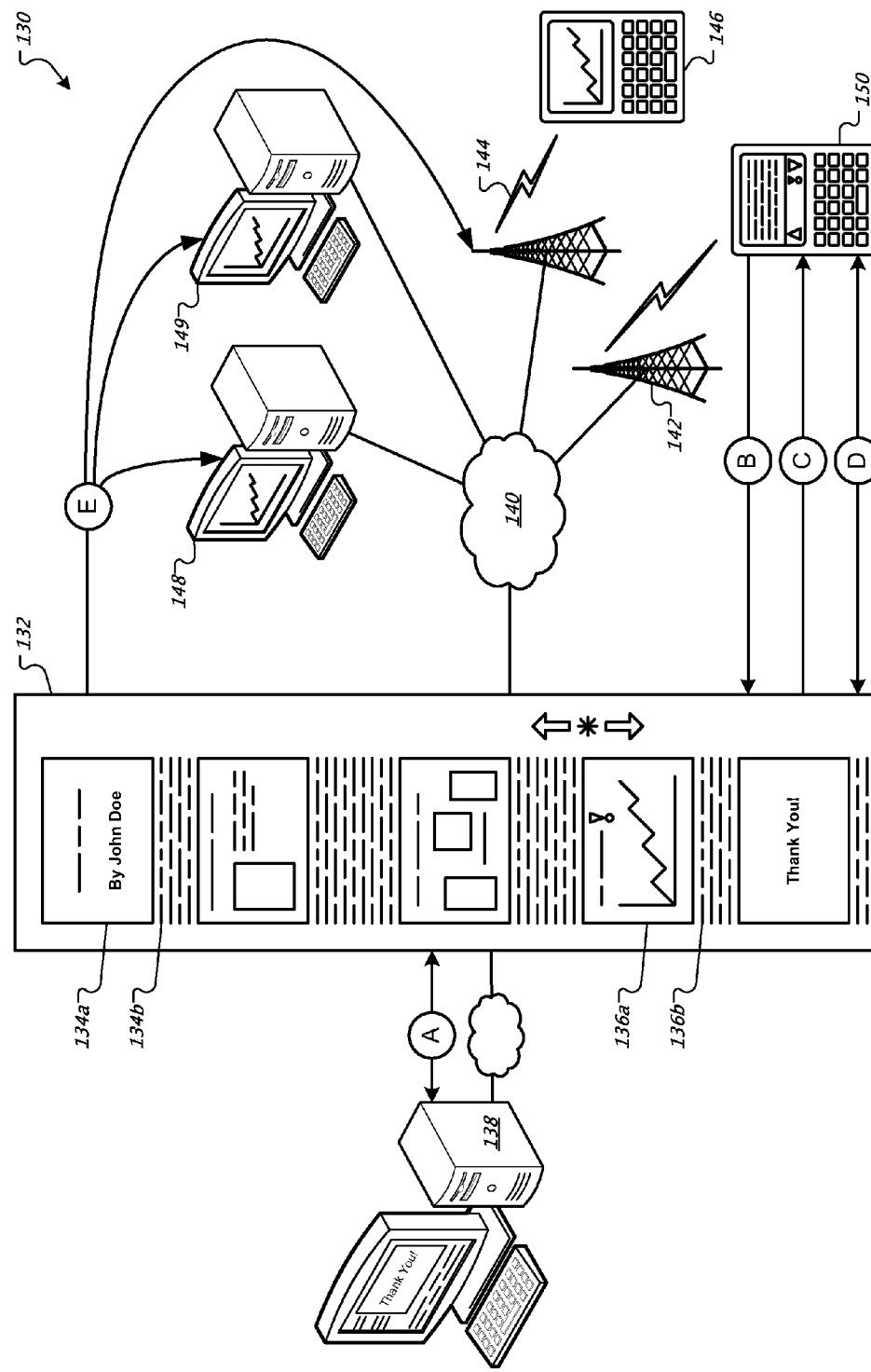

FIGS. 1A and 1B are conceptual diagrams of computer presentation systems. In general, the system 100 in FIG. 1A shows components by which a presenter may use her mobile device 120 as a remote control for a presentation. In this example, the presentation is stored in a central server 102.

The presentation may, according to familiar norms, include a number of elements. In this example, the presentation includes slides 104a, 106a, and speakers notes 104b, 106b, associated with each of the slides. The slides 104a, 106a, may be standard graphical representations of material that a presenter wants to show to attendees at the presentation. The speakers notes 104b, 106b, may be helpful notes that are intended to be seen only by the speaker, such as a script or outline of material that the speaker wants to cover when giving the presentation, and those notes may be displayed during a presentation only on the user's mobile device.

A desktop computer 108 represents a device on which the presentation may initially be created. Other forms of electronic devices may also be appropriate depending on the situation. The computer 108 communicates with the central server 102 through a network 110, such as the internet. Although the server 102 is mentioned here in the singular for clarity, the server 102 would typically include numerous servers with various functions, such as storage servers, web servers, and application servers accessed from one or more computer data centers that are remote from the other components shown in the figure.

Separately, the presenter is located in a presentation room 114 in which a projector 118 is projecting the presentation against a wall, so that others in the room may watch the presentation. Other forms of display devices may also be employed. A projector 118 is connected to a computer 116 that provides image data to the projector 118. However, in appropriate circumstances, the computer 116 may be integrated with the projector 118, as discussed below for flat-screen televisions that include internet browsing functionality. The computer 116 is in turn connected to network 110, such as to receive images of the slides 104a, 106a for display with the projector 118.

The presenter is shown as holding a mobile device 120, which may be in the form of a cellular telephone, a personal digital assistant (PDA), a smartphone, or other appropriate device. The mobile device 120 may contain a screen on which may be displayed various graphical items, and the mobile device 120 may also run a Web browser or similar application that permits access of services over the network 110. The mobile device 120 in this example is configured to communicate over a mobile network 112 and then through the network 110. The mobile network 112 may take a form similar to various wireless networks run by wireless data providers such as SPRINT, AT&T, T MOBILE, and other similar companies. The device 120 may additionally, or alternatively, communicate in similar manners via a WiFi or other type of wireless connection.

An exemplary sequence of operations that may be performed with the system 100 is shown by lettered arrows in FIG. 1A. Initially, computer 108 may be used to prepare the presentation in a familiar manner, such as by typing textual bullet points onto a slide, typing text into speakers notes, and adding images to the slide. Such preparation may take place completely on the computer 108, and the presentation may then be uploaded to the server 102, or may occur online with the computer 108 accessing server 102. Although a desktop computer is shown for clarity, since presentation authoring typically occurs on full-feature personal computers, other forms of computer may also be employed.

Such preparation of the presentation may be completed by the presenter before she arrives at the room 114, including by using her mobile device 120 well before the time of the presentation or even on the way to the presentation, such as to make final edits to the speakers notes and other elements of the presentation (e.g., after logging on from the mobile device 120 in a cab on the way to the presentation). The preparation may also occur by an assistant to the presenter, so that the presentation may be edited even while the presenter is in transit and the person editing the presentation does not have access, or direct access, to the mobile device 120. In addition, the presentation may be prepared collaboratively, because server 102 may be accessed by multiple different users over network 110.

Arrow B shows the computer 116 accessing the presentation through the network 110. Such action may occur by a message being provided to the computer 116 indicating a URL for the presentation. A message may also include verification information, such as a password, that is needed to access the presentation. The message may be sent, for example, from the mobile device 120 to the computer 116. Alternatively, the URL may be accessed from the computer 116 by a user of the computer 116 accessing server 102, and entering an identifier for the presentation. In one example, the identifier may be a name of the presenter, or other similar identifier.

As shown by Arrow C, the presenter then logs onto the server 102 (an action that may also take place before the action shown by Arrow B). The log on process may be slightly different from that of the computer 116, in that the computer 116 may provide a presentation identifier, along with an indication that it will be on the receiving end of the presentation. In contrast, the mobile device 120 may provide an identifier, along with an indication that it will be on the controlling end of the presentation. The procedure of the log in may also be different for the mobile device 120, because the user of the mobile device 120 may already have been associated with the presentation via the user's account with the service (e.g., GOOGLE) that operates server 102.

Alternatively, a creator or editor of the presentation may identify a telephone number associated with mobile device 120. In addition, a time for the presentation may also be associated with the presentation. The server 102 may then, either immediately or slightly before the scheduled time for the presentation, send a message such as an SMS message, to the device 120, and may include a private or unlisted URL that the user of the device 120 may select to be taken to a page for controlling the presentation and for seeing their speakers notes. Such scheduling make take place as part of the presenter's preparation of a meeting reminder and/or invitation, so that a general scheduling system may be employed to remind the presenter of the meeting and also to provide the presenter with the link or other information needed to access the presentation. A presenter may thus authorize a mobile device at the time of a presentation or at another time, such as at the time of setting up the presentation as a calendar event (where the SMS can be sent before the time for the presentation), so that the presenter need not wait to authorize their device in front of an audience.

Upon logging in, the mobile device 120 may display graphical icons for controlling the presentation, and other information. The icons may include arrows for moving up and down (or back and forth, depending on one's orientation) between slides in a presentation. Although actual controls are not shown on device 120 because of size limitations, such motion between slides is shown schematically by the arrows in server 102. In this example, the presenter is currently on slide 106a, and can next move to the slide above or below slide 106a by selecting up or down arrows on device 120. Other user interfaces than those shown schematically here may also be used.

Arrow D shows new information flowing to computer 116 in response to control decisions made by the presenter at device 120. For example, the slide being displayed may change if the presenter has selected, on the device 120, to move forward or backward in the presentation slides. Such control by the presenter may also result in the display of device 120 changing in synchronicity with the display of projector 118.

In one implementation, what is displayed on device 120 may be identical to what is displayed by projector 118, such as the presentation slides. The displays may be coordinated so that, as the presenter moves from one slide to the next on device 120, the slide also changes on the projector 118. The device 120 may also display additional items, such as icons for up and down arrows, which may be displayed next to, or superimposed over, the presentation slides on the mobile device 120 but not via the projector 118.

Because screen size may be an issue on mobile devices, and because the presenter can see the slides by looking at the actual presentation (e.g., projected on the wall of room 114) when the presenter is in the same room as the presentation, the mobile device 120 can display information that differs from, but is coordinated with, that displayed by projector 118. In one example, the device 120 may display speaker's notes that correlate to the slide currently being displayed by projector 118, (optionally along with controls for moving between slides). In another, the device 120 can display the next slide in the series so that the presenter can have a peek forward in the presentation. The particular matter displayed on the device 120 may be made selectable from the device 120 so that the presenter can select and alter their experience just before or even during the presentation. Also, the presenter may control the presentation from a site that differs from that of the audience, such as if the presentation is being displayed over a videoconference connection, and may be provided with options to change the display on their mobile device 120 depending on where they are relevant to the actual presentation and audience.

FIG. 1B shows a system 200 that is similar to the system 100 in FIG. 1A. However, in this implementation, the presentation is being broadcast to a number of various computers and displays at once. The presenter may be in the same room as those other displays in one embodiment. For example, the presenter may be conducting training at which the attendees are each seated at individuals computers, and the presenter may control what is shown on their computers (either individually or collectively) and may also see what is shown on their computers. For example, where the control is individual, so that different attendees have different experiences, the device 150 may show a control panel for switching between computers for each of the attendees, and when the presenter has switched to a particular attendee, the device 150 may show what is being displayed to that particular attendee, may show status information about the attendee (e.g., has the attendee successfully completed a training exercise), and may display controls for affecting what is shown to the attendee (e.g., so that the presenter can move the attendee to a next exercise once the presenter has verified that the attendee executed the exercise properly).

The system 130 includes a desktop computer 138 or similar device that, as in the prior example, is used to author and edit a presentation. The presentation itself is stored on a server 132 that can receive instructions from, and provide information to, a number of devices over a network 140, which may include the internet. As with the prior presentation, the presentation shown here includes elements such as presentation slides 134a, 136a and speakers notes 136a, 136b. As shown here schematically, the presentation is currently on slide 136a and related speaker's notes 136b.

A mobile device 150 that is remote from the server 132 controls the display of the presentation via wireless network 142 and network 140. Again, the wireless network 142 may be a standard commercial wireless data network taking a variety of forms. And in this example, the presentation is being displayed on a number of computing devices 146-149. One such device is a mobile device 146 communicating through wireless data network 144. The other devices are computers 148, 149, which may take the form of desktop, laptop, UMPC, or other such computers.

Again, lettered arrows show an example flow of operations in the figure. Arrow A shows interaction between computer 138 and server 132 in the preparation and/or editing of a presentation. Such work may occur through a variety of mechanisms, such as those discussed above. Arrow B shows commands being sent from mobile device 150 to start the display of a presentation. For example, a user of the device 150 may visit a web site associated with server 102 and may be identified if they have previously logged in, such as during the current session.

As shown by Arrow C, certain controls for operating the presentation may be returned to the device 150. Such controls may be displayed as part of a stand-alone application or, for example, by a standard web browser such as the FIREFOX or INTERNET EXPLORER web browsers. As shown in the example in the figure, the device 150 has been sent HTML or other mark-up code to generate a display of speaker's notes 136b, and on-screen controls in the form of up and down arrows for moving between slides. Softkey buttons on the device 150 that are aligned with the arrows may be used to navigate through the slides, or similar functionality may be provided by a touch screen (e.g., where the user can use finger movements to push or flick the slides up or down on the screen, or can touch directional arrows). The visual presentation of the controls could also be eliminated, such as where the presenter has already been informed that navigation may be by touch, by manipulation of a 4-direction key, or by a scroll wheel, among other options. The presenter can change displays, e.g., to see various settings associated with a presentation by selecting an appropriate key or other input mechanism.

Arrow D shows subsequent interactions between the device 150 and the server 132, where the presenter has manipulated controls on the device 150 so as to move through slides on the presentation. The communications from the device 150 to the server 132 may include navigational commands from the presenter (transmitted, e.g., as HTTP requests from a browser), whereas the communications from the server 132 to the device 150 may include presentation information that can be graphically displayed on the device 150, among other things (transmitted, e.g., as HTML, XML (e.g., in an AJAX implementation), or other form of code).

Arrow E shows a separate transmission of presentation display data to the other computing devices 146-149. In general, the presentation will simply include the presentation slides, though other or additional information may also be transmitted. Each user of the various devices may log in to the server 102 (which log in process may be handled by a separate but related server, particularly in large organizations), and may provide identifying information for the particular presentation they would like to see. Such information may have come from the presenter previously e-mailing or otherwise messaging a link and/or other information to them.

The interaction shown by Arrow D and the provision of information shown by Arrow E may generally occur in a coordinated manner. For example, when a presenter chooses a control to change slides, a display with a new slide will be sent to each of the devices 146-148. Users of the devices 146-148, however, may also provide feedback to the server 132 which may then be communicated to the device 150 (e.g., typed questions from a member of the audience).

In this manner, and in certain particular implementations, the system 132 may permit a user to control a presentation remotely and present it in a variety of ways to various viewers of the presentation. The user may be able to do so using a convenient and familiar device such as their own smartphone, and need not store the presentation on the smartphone. As a result, certain operations may be obtained that would not be possible with a remote control having limited computing or display capabilities, and can also be conducted without having to store the presentation on the device 150.

Figure 2:
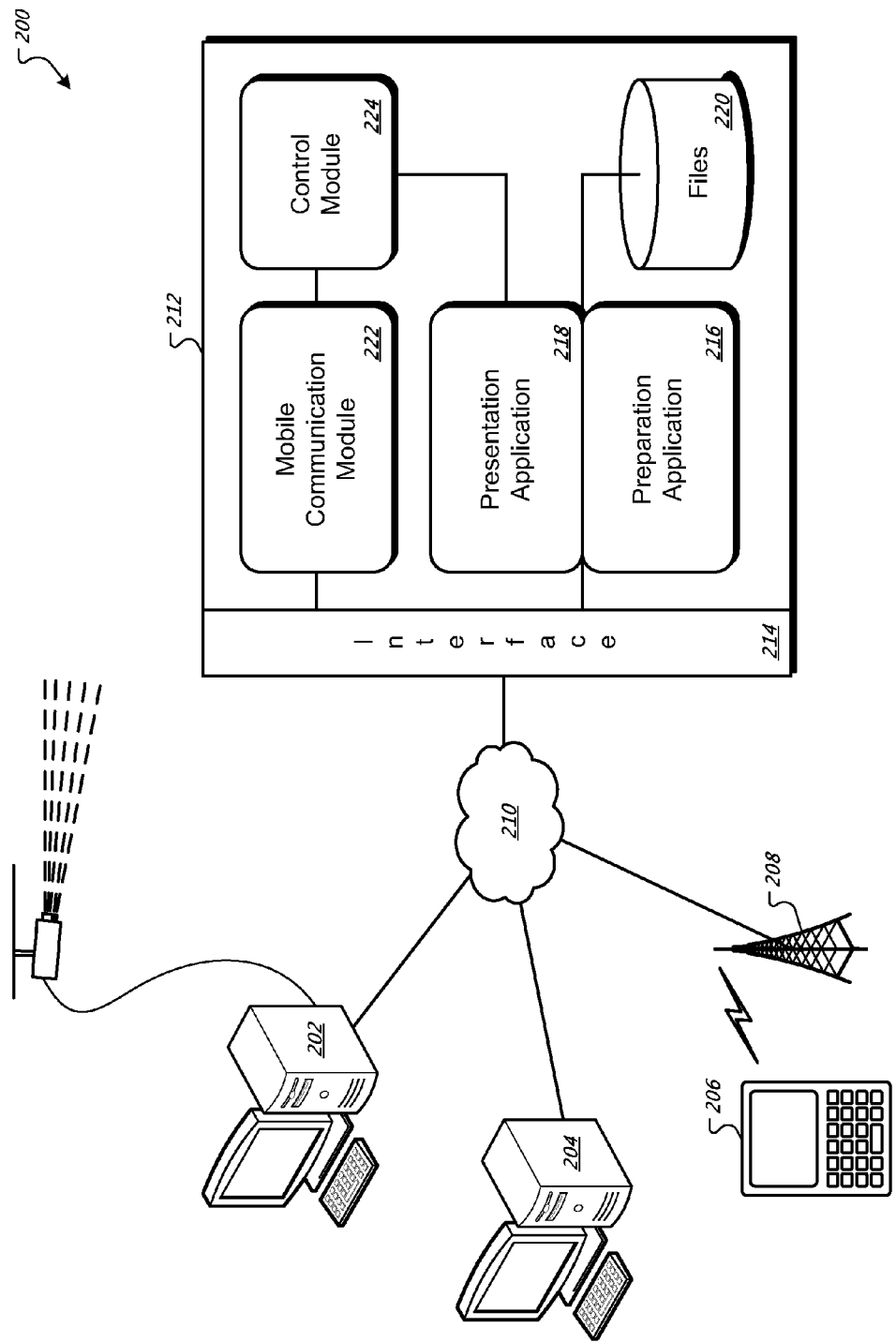
FIG. 2 is a schematic diagram of a computer presentation system.

FIG. 2 is a schematic diagram of a computer presentation system 200. Here, the figure focuses on a server, such as server 102 or server 132, that may be used to store, manage, and present a presentation in various manners.

The system 200 includes a number of components to connect through a network 210, such as the Internet. For example, a computer 204 may be used in a familiar matter to prepare and edit presentations for later display. A mobile device 206 may communicate through a wireless data network 208 to call up and control the display of the presentation. The device 206 may also complete similar communications through a separate wireless network, such as where a first data network is run through a cellular network and the internet, and a second data network is run over a WiFi connection to a local area network, and then possibly to the internet. By the various connections, the communication from a wireless device to a presentation server may be over various networks that include the internet as part of their span, or can include only a LAN or WAN. The communication from the presentation server to a display device (which may incorporate display capabilities, such as a television capable of conducting HTTP communications and operate JAVA-based, Flash, or similar programs, such as a PANASONIC VIERA television). As such, a television would simply need a network connection (which might lead to the internet) and IP address, and a mobile device would need a network connection, where both the network connections would need to reach the remote presentation server.

A separate computer 202 may also be connected to the network 210, and may be controlled to display the presentation, such as through an overhead projector or other display system. However, as noted, the network communication and presentation may also be handled by the display device itself.

The presentation server 212 may take a variety of forms and may include one or more servers working in cooperation. For example, the server 212 may include a number of different servers at an central internet service company, including web servers, authentication server, storage servers, application servers, and other such devices, among others. The server 212 includes an interface 214 which may serve to receive commands for creating, editing, and presenting presentations, among other things. Interface 214 may take a variety of forms, such as one or more Web servers.

A preparation application 216 may permit various users to identify templates for visual presentations, to add information to the presentations, and to edit the presentations. The preparation application 216 may also permit multiple users to edit a single presentation, either in series or simultaneously. Such an application may take a form like GOOGLE PRESENTATIONS.

A presentation application 218 that is associated with the preparation application 216 may control the display of presentations stored on the server 212. Presentations may be stored, for example, in a files database 220 by the preparation application 216, and may be accessed for display by the presentation application 218.

The display of presentations may be made under the control of mobile device 206 communicating through a mobile network 208, main network 210 (such as the internet), and then through mobile communication module 222. The mobile communication module 222 may interpret requests or commands made in communications such as SMS messages, MMS messages, HTTP requests and the like. The mobile communications module 222 may also return information to the user of device 206, where the information is needed for controlling the presentation, such as by WML, XML, HTML, xHTML, or other appropriate format.

The mobile communication module 222 may in turn communicate with a control module 224 that may interpret commands passed from the device 206, and may forward those commands (either in original or reformatted form) to the presentation application 218. For example, the presentation application 218 may be designed to operate relatively independently from the particular form of control that is being used to control the presentation. For example, the control may take a variety of forms and use a variety of protocols or interfaces, and particular control modules such as control module 224 may interpret commands from those protocols or interfaces into a standard format that may be handled conveniently by the presentation application 218. In this manner, the authors of the presentation application 218 may write their code relatively generically, and may receive commands and provide displays generically, and other modules may undertake the task of interpreting commands and formatting output for particular situations.

Figure 3:
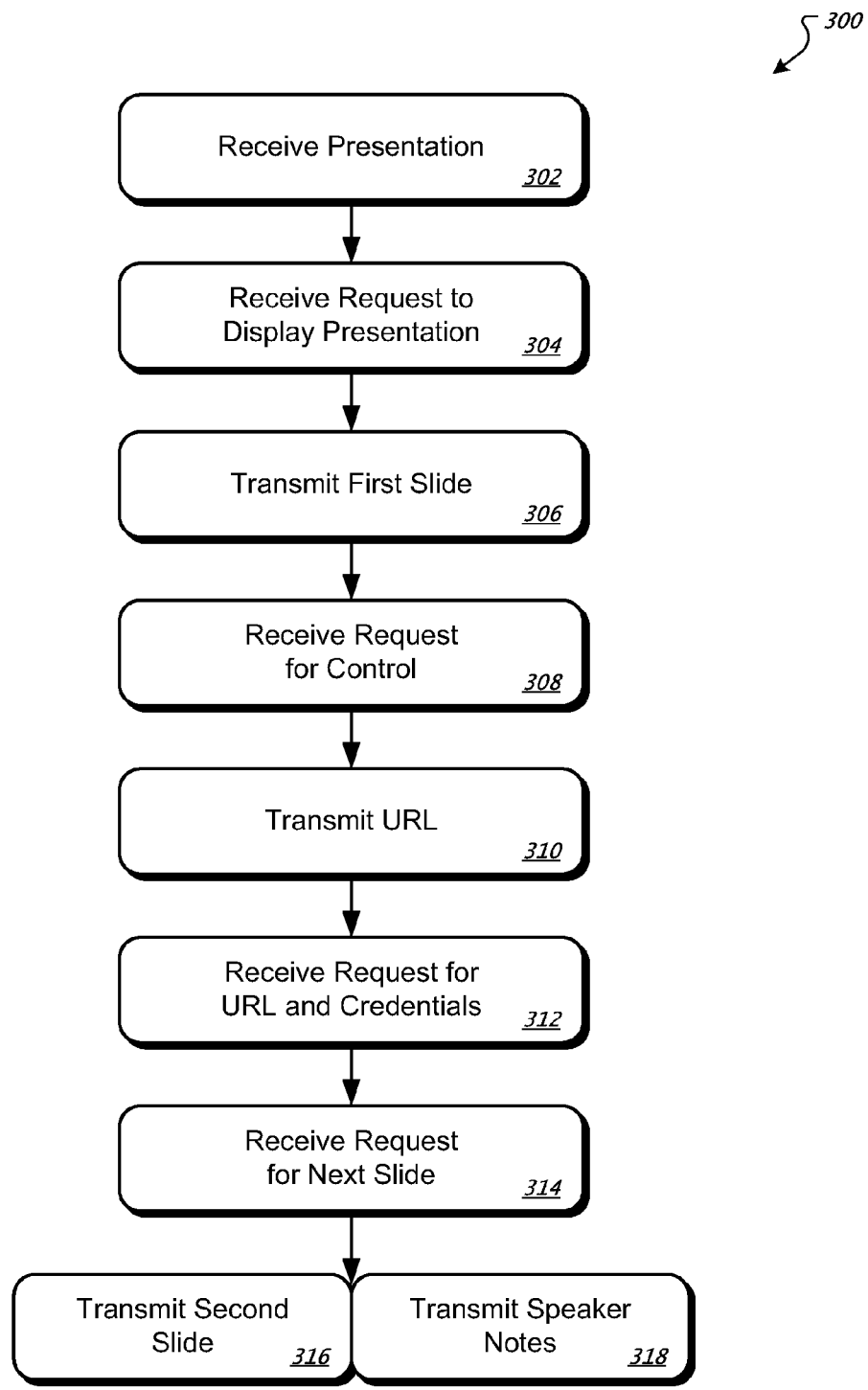
FIG. 3 is a flow chart of an example process for receiving and displaying a presentation.

FIG. 3 is a flow chart of an example process 300 for receiving and displaying a presentation. The process 300 may typically occur on a server that stores a presentation and then provides the presentation for display on a display device that is separated from the server by a network such as the internet.

In general, the process 300 shows actions that may be taken by a server, such as servers 102, 132, or 212, shown in the figures above. The server may be configured to receive commands from a mobile device that will result in providing a presentation over one or more other devices that are independent from the mobile device. For example, the mobile device may belong to a user who works for one organization, where the computers presenting the presentation belong to another organization. Such devices may be termed to be independent of each other, in that they are designed to perform without regard to the other devices in normal operation, but may perform together when tied together by the server. In one particular example that expresses such independent operation, the mobile device and the devices on which the presentation are made, can be said to be from different Internet domains, so as to indicate that they belong to different organizations, and are not simply an IR or Bluetooth remote control communicating within a single room (even though they may be in the same room).

The presentation process begins at box 302, where the server initially receives a presentation. As discussed above, the receipt of the presentation may occur by a user of a personal computer or laptop or other form of computer uploading a presentation or preparing and editing a presentation with the server or a related server. After receiving the presentation, the server may store it until additional commands for handling the presentation are received.

At box 304, the server receives a request to display the presentation. The request may come, for example, from a mobile device that is operated by a user who has prepared the presentation. The request may follow a log in procedure by that user, and identification of the appropriate presentation by the user. Upon receiving such a request, the server may transmit a first slide (box 306), such as a title slide of a presentation. This may permit the user to verify that they selected the appropriate presentation.

The request may also come from the user selecting a URL that was previously provided to the user's mobile device form the server. For example, when the presentation was created, the user may have provided a telephone number for his or her mobile device. The server may then use that number to send a private URL to the device in an e-mail or text message. The user's subsequent selection of that URL may send an HTTP request to the server that contains an alpha-numeric identifier for the presentation, and the server may respond by transmitting the first page of the presentation to a presentation computer or to the mobile device, and may begin accepting commands from the presenter's device.

The presentation may be kept in that mode until the user requests control over the presentation, at box 308. The request may also include identifiers for machines on which the presentation is to be presented, if those machine have not already identified themselves to the system. For example, e-mail addresses for users who will watch the presentation may be provided to the server, and a URL pointing to the presentation may be sent to them by the server (box 310).

At box 312, those other users may have clicked on the URL, which may return an HTTP request back to the system, and the users may optionally be asked for credentials, such as an identifier or password that was given to them by the first user of by the system. In certain other embodiments, the viewers of the presentation may log in without first receiving a notice from the server. For example, a presenter may arrive at a site, log in as a controller with his or her mobile device, and may provide a web site and presentation name (and perhaps password) to a technician controlling the A/V equipment at the site. By following the instructions from the presenter (which may simply be transmitted orally), the technician may quickly bring up the presentation with the first slide showing.

Once the presenter sees that the system is working, he or she may start the presentation. At box 314, the system receives a request to change slides, such as by the presenter selecting an appropriate control on his or her mobile device. Such a change may result in a split response by the server—with one response being sent to the controlling device and one to the presenting device. For example, the presenting device may receive the next slide (box 316), while the controlling device may receive the speaker's notes that correspond to that next slide (box 318).

In some implementations, the server transmits each slide to the presenting device as commands are received from the controlling device. Thus, the presenting device may cache a copy of a slide that is presently being displayed but not all slides in the presentation. In some examples, the presenting device may cache more than the slide that is being displayed (e.g., the next two and previous two slides) so that the device can respond quickly to a slide change command. In some implementations, the server transmits the entire presentation to the presenting device, the presenting device caches the entire presentation, and the server thereafter acts as a conduit to pass control signals from the controlling device to the display device.

Figure 4:
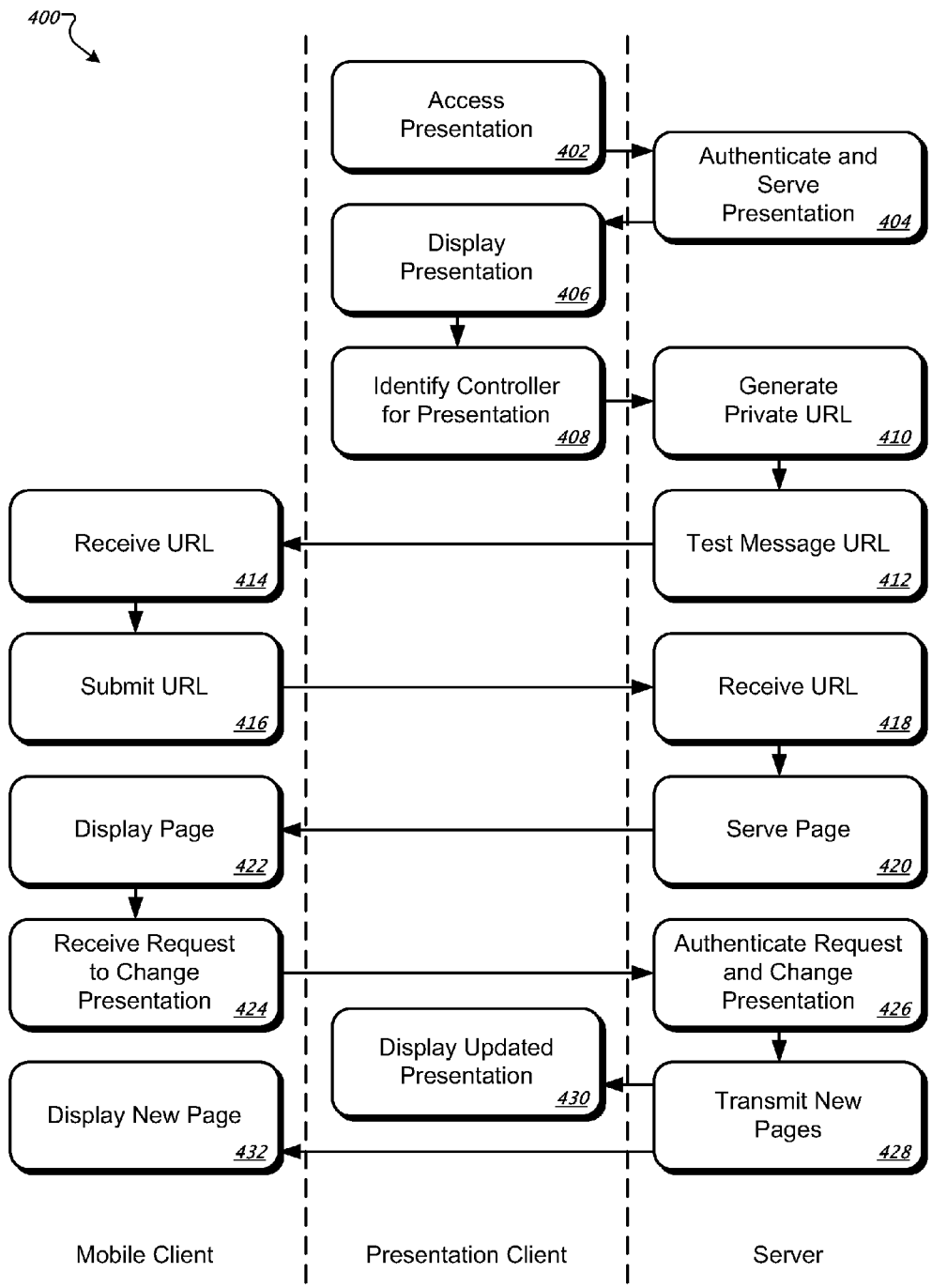
FIGS. 4 and 5 are swim lane diagrams showing interactions between devices for displaying computer presentations.
Figure 5:
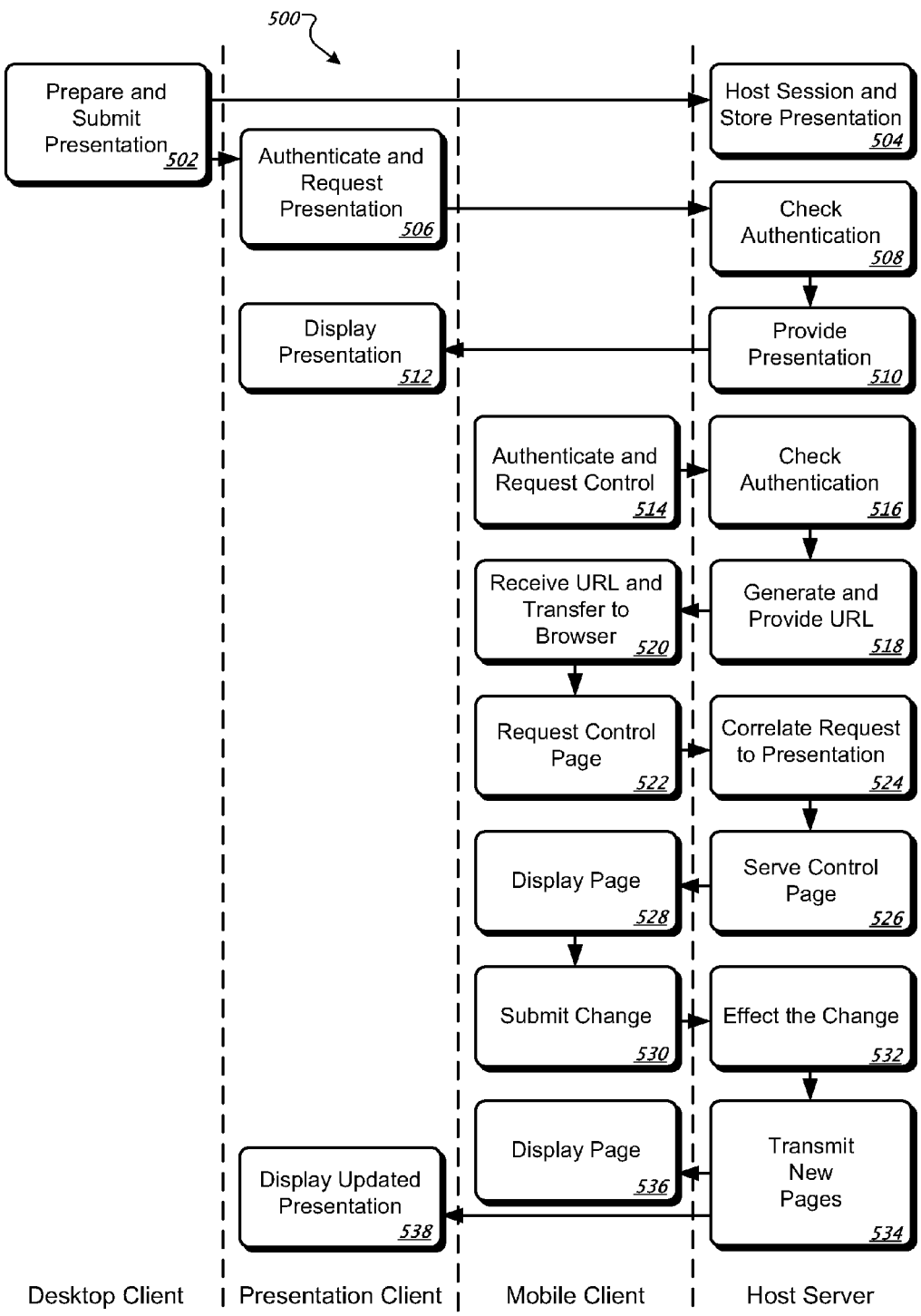

FIGS. 4 and 5 are swim lane diagrams showing interactions between devices for displaying computer presentations. In general, both figures show examples of activities that may be performed by various components in a display system, and communications that may be made between those components. Referring now to FIG. 4, at box 402, a presentation client accesses a presentation by submitting an access request to a server. The presentation client may include, for example, a computer that is connected to a projector or computer monitor for displaying the presentation to various members of the presentation audience. At box 404, the server authenticates a user at the presentation client, such as by requesting and receiving an identification number and password, and begins to serve the presentation to the presentation client. For example, a server may display a title page or other initial display relating to the presentation. However, the server may limit the display so that additional information from the presentation, such as confidential information, is not initially displayed, until a presenter appears and takes over control of the presentation.

At box 408, a controller for the presentation is identified at the presentation client. For example, an e-mail address relating to a presenter may be provided or other information may be provided. At box 410, the server generates a private URL, and in box 412, send the URL by a text message to a mobile client, which receives the URL at box 414. The URL may relate to the presentation, and a user at the mobile client may submit the URL back to the server at box 416, where the URL is received at box 418, causing the server to serve a page at box 420. Such served page may require a user at the mobile client to enter an appropriate password and other information. Also, although the general flow shown here involves initial contact through the presentation client followed by an invitation to the mobile client, other steps may also occur, such as initial identification through a mobile client, with an invitation being sent to one or more presentation clients.

At box 422, the mobile client displays the page served by the server. The page may be a webpage that includes various code, such as mark up code, for generating controls, such as graphical controls by which a user may navigate through a presentation. Upon seeing the display of controls, a user at the mobile client may choose one of them, so that, at box 424, the mobile client sends a request associated with the control selected by the user, such as a request to change the presentation by switching to a next slide in the presentation. The box 426, the server receives the request, checks to ensure that it is from an authenticated user at the mobile client, and causes the slide in the presentation to be changed. The server then, at box 428, transmits new pages to both the mobile client and the presentation client. The presentation client receives an updated presentation, at box 430, such as a new slide from the presentation. The mobile client receives a new webpage, at box 432, such as another page showing controls for navigating in the display and perhaps a slide number, a slide thumbnail, and/or other indication related to the presentation. Such interaction with the presentation by the mobile client, and coordinated display of the presentation by the presentation client, may then continue in similar manners.

FIG. 5 shows a process 500 that is similar to the process 400 from FIG. 4, but involves additional interaction between a client controlling a presentation and a server serving the presentation. The example process begins at box 502, where a desktop client first prepares and submits a presentation. Though termed a desktop client for convenience here, the computing device may take many forms, including a laptop or other computing device. The desktop client may then provide an identifier for the presentation to a presentation client and also to a host server. In response, the host server may host a session for preparing the presentation and may also store the presentation when it is submitted. For its part, the presentation client may authenticate itself to the host server and may request the presentation, at box 506. The host server may in turn check the authentication at box 508, such as by verifying a URL submitted by the presentation client and a related password submitted by the presentation client. If the authentication information checks out, the host server may provide the presentation to the presentation client at box 510, and the presentation client may begin to display the presentation at box 512.

Before or after the presentation client requests and begins to receive the presentation, a mobile client may itself be authenticated with the host server, and may authenticate itself in a manner that provides it with control over the presentation, as shown at boxes 514, 516. Upon receiving and verifying proper authentication, the host server may generate a URL and provide it back to the mobile client at box 518, which may then cause a browser or other application on the mobile client to be redirected to a control page hosted by the host server, as shown at box 522. Upon receiving a request from the redirection, such as in the form of an HTTP request from the mobile client, the host server may identify to the presentation the device from which the request is made, at box 524, and then may serve the appropriate control page to the mobile client at box 526. For example, when a control page is first requested, the page may be generated to display information showing that the presentation is currently on a first or title slide.

Upon receiving code such as mark up code for the control page, the mobile client may display the page at box 528, and may receive from a user a change to the page such as an indication to change slides. The mobile client may then submit such a change at box 532 to the host server, which may effect the change in the presentation at box 532. For example, the change may involve changing slides in a particular presentation, beginning the operation of a feature on a page, such as a sound recording or an animation, a selection of a hyperlink on a slide in the presentation, or switching to a different presentation, among other things.

In addition, other changes may be effected, such as by causing the server to display information from an application other than the application running the presentation. As one example, a user may wish to break out of a presentation and show information that is available on the Internet through a web browser. As such, the host server may switched to a web browser application and permit the user of the mobile client to manipulate that browser.

Where the change effected by the user is simply switching from one slide to another, the host server may transmit new pages (which may occur by updating content on a currently displayed page, or URL) relating to the new slide at box 534, to each of the presentation client and the mobile client. At box 536, a mobile client displays a new page, such as a page showing the same or slightly different controls as the original page. At box 538, the presentation client displays an updated presentation such as a next slide of the presentation that was previously displayed.

Figure 6:
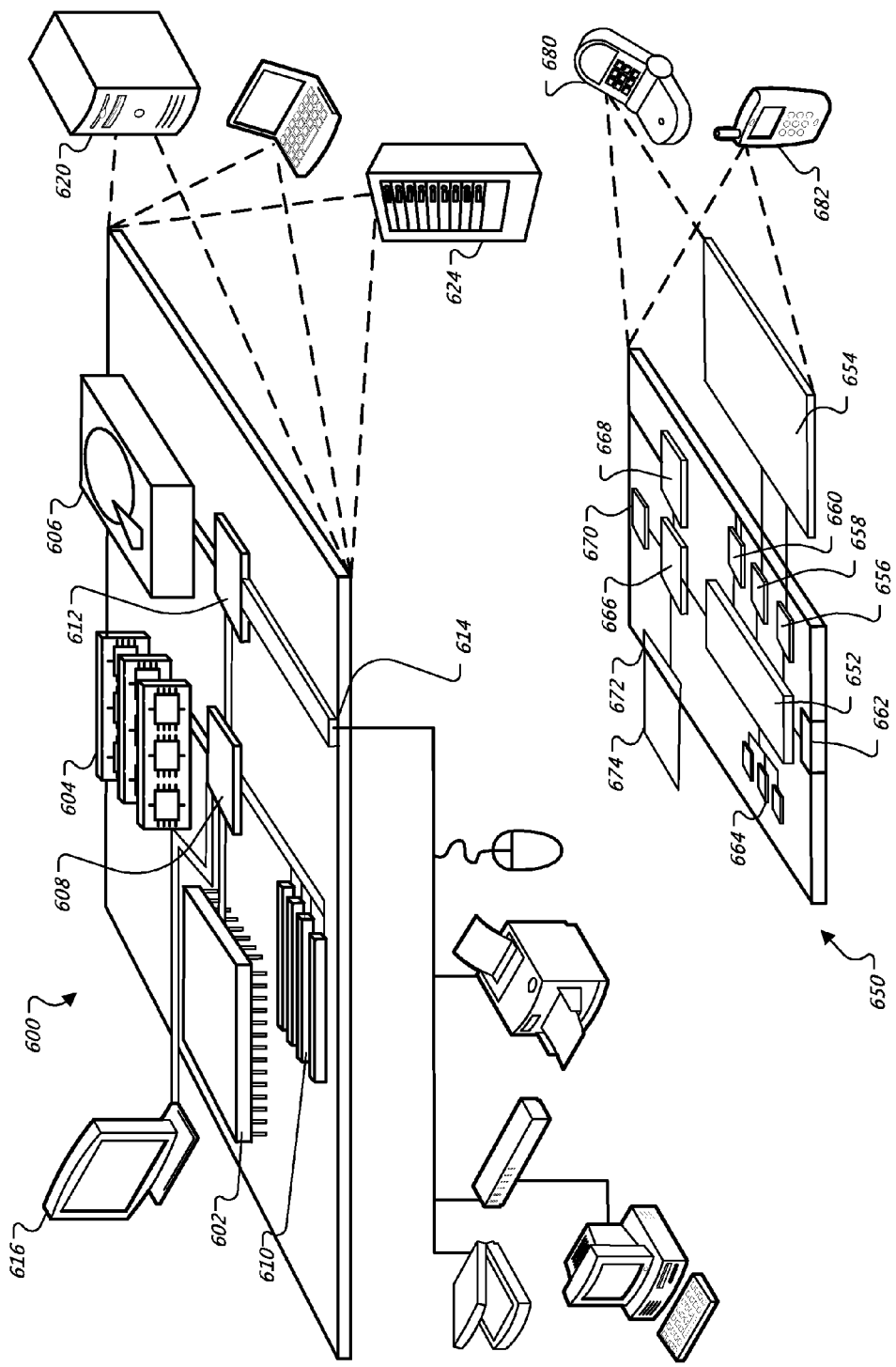
FIG. 6 shows an example of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to slide-based presentations, but other forms of wireless device control over displays buy remote computing devices may also be addressed, such as displays of computer desktops and video presentations.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented presentation method, comprising:

transmitting, by a first computing device and over a network to a remote server, a request to access a presentation that includes multiple slides and that is stored on the remote server, wherein the first computing device communicates with the network over a wireless connection;

receiving, at the first computing device and as having been sent from the remote server in response to the request to access the presentation, one or more of the multiple slides of the presentation;

receiving, at the first computing device, user input for switching the presentation from a first slide of the multiple slides to a second slide of the multiple slides;

changing, by the first computing device in response to receiving the user input to switch from the first slide to the second slide, a first display of the presentation by the first computing device from the first slide to the second slide;

sending, from the first computing device and to the remote server in response to receiving the user input to switch from the first slide to the second slide, a request to change the presentation from the first slide to the second slide, so as to cause the remote server to transmit, over the network and for receipt by a second computing device, information for causing the second computing device to change a second display of the presentation by the second computing device from the first slide to the second slide, the second computing device being different from the first computing device and the remote server.

2. The computer-implemented presentation method of claim 1, further comprising:

displaying, in a graphical user interface of the first computing device, one or more presentation controls; and receiving, by the first computing device, the user input as a user selection of one of the one or more presentation controls, wherein the first computing device sends the request to change the presentation from the first slide to the second slide in response to receiving the user input as the user selection of the one or more presentation controls.

3. The computer-implemented presentation method of claim 1, wherein the second display of the presentation by the second computing device is in a standard web browser application.

4. The computer-implemented presentation method of claim 1, further comprising transmitting, by the first computing device and to the second computing device, information that indicates an address of the presentation stored on the remote server in order to provide the second computing device with access to the presentation, the information that indicates the address of the presentation being transmitted by the first computing device and to the second computing device without routing the information through the remote server.

5. The computer-implemented presentation method of claim 1, further comprising:

receiving, by the first computing device, an SMS message that includes a link or an address to the presentation; and receiving, by the first computing device, user input of a selection of the link or the address to the presentation, wherein receiving the one or more of the multiple slides of the presentation at the first computing device is in response to receiving the user input of the selection of the link or the address to the presentation.

\* \* \* \* \*